United States Patent
Inston

(10) Patent No.: US 8,420,183 B2
(45) Date of Patent: Apr. 16, 2013

(54) METHOD OF MANUFACTURING COMPOSITE MATERIAL

(75) Inventor: David Inston, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/564,289

(22) Filed: Aug. 1, 2012

(65) Prior Publication Data
US 2012/0292828 A1 Nov. 22, 2012

Related U.S. Application Data

(63) Continuation of application No. 12/375,108, filed as application No. PCT/GB2007/050462 on Aug. 1, 2007, now Pat. No. 8,241,711.

(30) Foreign Application Priority Data
Aug. 7, 2006 (GB) .................................... 061544.2

(51) Int. Cl.
*H05H 1/00* (2006.01)
*B05D 3/12* (2006.01)
*B32B 27/04* (2006.01)

(52) U.S. Cl.
USPC ......... 427/535; 427/538; 427/176; 428/292.1

(58) Field of Classification Search ............... 427/535, 427/536, 538, 174, 175
See application file for complete search history.

(56) References Cited

U.S. PATENT DOCUMENTS

| | | | |
|---|---|---|---|
| 4,496,415 A * | 1/1985 | Sprengling | 156/283 |
| 4,606,930 A * | 8/1986 | Ueno et al. | 427/538 |
| 4,664,936 A | 5/1987 | Ueno et al. | |
| 5,108,780 A | 4/1992 | Pitt et al. | |
| 5,180,780 A | 1/1993 | Nakamura et al. | |
| 5,266,139 A * | 11/1993 | Yokota et al. | 156/169 |
| 5,391,855 A | 2/1995 | Tanisaki | |
| 5,549,780 A | 8/1996 | Koinuma et al. | |
| 5,895,622 A | 4/1999 | Ramani et al. | |
| 6,066,826 A | 5/2000 | Yializis | |
| 6,133,167 A | 10/2000 | Green et al. | |
| 2003/0010939 A1 | 1/2003 | DeMeo et al. | |
| 2008/0118734 A1 | 5/2008 | Goodwin et al. | |

FOREIGN PATENT DOCUMENTS

| | | |
|---|---|---|
| DE | 19610113 | 9/1997 |
| EP | 0191680 | 8/1986 |
| EP | 0583090 A1 | 2/1994 |
| GB | 2097407 | 11/1982 |

(Continued)

OTHER PUBLICATIONS

British Search Report for GB0615644.2 dated Nov. 21, 2006.

(Continued)

*Primary Examiner* — Dah-Wei Yuan
*Assistant Examiner* — Jose Hernandez-Diaz
(74) *Attorney, Agent, or Firm* — Lowe Hauptman Ham & Berner, LLP

(57) ABSTRACT

Disclosed is a method of manufacturing a composite sheet. The method comprises (a) irradiating a sheet of fibers and a matrix film at an irradiation zone with a plasma at substantially atmospheric pressure, and (b) impregnating the sheet of fibers with the matrix at an adhesion zone. The processes (a) and (b) are performed simultaneously, and the matrix film is irradiated with a plasma at said irradiation zone after being unwound from a roller and prior to entering said adhesion zone.

8 Claims, 1 Drawing Sheet

FOREIGN PATENT DOCUMENTS

| | | |
|---|---|---|
| JP | 57074115 | 5/1982 |
| JP | 64001734 | 1/1989 |
| JP | 1272731 | 10/1989 |
| JP | 6155465 A | 6/1994 |
| JP | 11209484 A | 8/1999 |
| JP | 2005171432 | 6/2005 |
| WO | 9428568 | 12/1994 |
| WO | 02083773 | 10/2002 |

OTHER PUBLICATIONS

ISR and Written Opinion for PCT/GB2007/050462 dated Nov. 20, 2007.

Translation of Office Action corresponding to JP 2009-523353, dated Oct. 23, 2012.

* cited by examiner

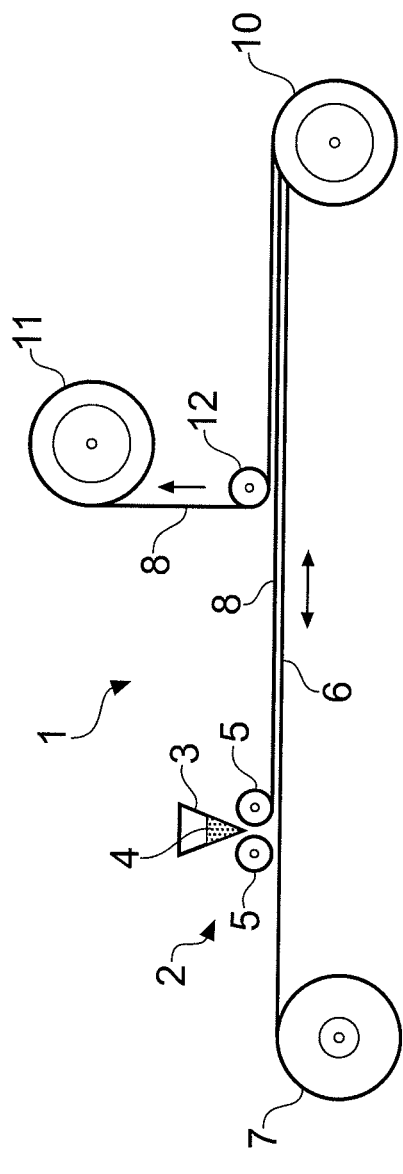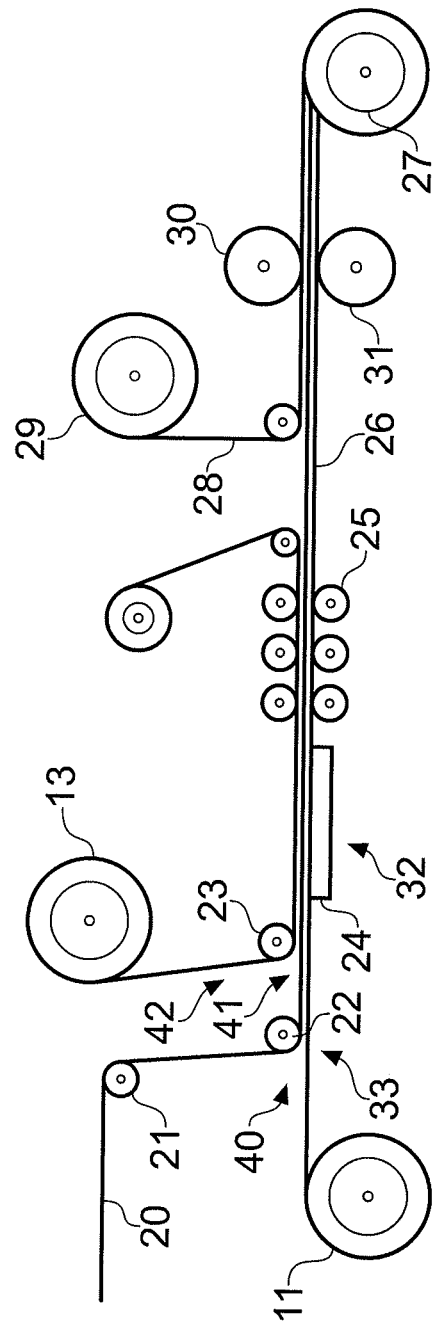

METHOD OF MANUFACTURING COMPOSITE MATERIAL

RELATED APPLICATIONS

The present application is a continuation of U.S. application Ser. No. 12/375,108, filed Jan. 26, 2009 and is based on International Application Number PCT/GB2007/050462 filed Aug. 1 2007, and claims priority from British Application Number 0615644.2 filed Aug. 7, 2006, the disclosures of which are hereby incorporated by reference herein in their entirety.

FIELD OF THE INVENTION

The present invention relates to a method and apparatus for manufacturing a composite material.

BACKGROUND OF THE INVENTION

In U.S. Pat. No. 5,108,780 a single fibre of reinforcing filament is irradiated with a plasma in a vacuum chamber prior to being coated with a thermoplastic coating. Immediate coating of the plasma treated fibre with the thermoplastic produces stronger interfacial shear strength than when the fibre is exposed to air or other free-radical-quenching species before it is coated.

The abstract of JP2005171432 describes a method of manufacturing fibres for polymer composite reinforcement. The fibres are subjected to a first plasma treatment under ordinary pressure followed by a second plasma treatment in a medium containing a gaseous alkene or alkyne at ordinary pressure. An adhesive is imparted after the plasma treatments.

SUMMARY OF THE INVENTION

A first aspect of the invention provides a method of manufacturing a composite sheet, the method comprising:
  a. irradiating a sheet of fibres at an irradiation zone with a plasma at substantially atmospheric pressure, and
  b. impregnating the sheet of fibres with a matrix at an adhesion zone;
  wherein processes a. and b. are performed simultaneously.

The first aspect of the invention irradiates a sheet of fibres (instead of a single fibre) and simultaneously runs an impregnation process to produce a sheet of fibres impregnated with matrix (commonly known in the art as a "prepreg"). This can be contrasted with the prior art above which only produces a single filament of fibre. The method enables a sheet to be formed without having to treat the fibres with an intermediate product (for example the thermoplastic in U.S. Pat. No. 5,108,780 or the alkene/alkyne in JP2005171432).

The sheet of fibres may be fully impregnated, or only partially impregnated to form a so-called "partial prepreg".

Irradiating at substantially atmospheric pressure means that no special containment system is required for the irradiation zone.

Typically process b. is also performed at substantially atmospheric pressure, typically in air. This runs contrary to the teaching of U.S. Pat. No. 5,108,780 which requires coating of the fibre in a controlled environment (that is, either in a vacuum or an inert gas).

The sheet of fibres may be impregnated by application of a fluid matrix melt, or the matrix may be in a sheet form during process b. Direct application of a fluid matrix melt provides the advantage that a process step (formation of the matrix sheet) can be omitted. However, the use of a sheet of matrix is preferred because this requires less modification of conventional manufacturing processes, enables the matrix to be irradiated more easily, and enables the preparation of a partial prepreg, if desired.

Preferably the sheet of fibres is moving during step a, and preferably the sheet of fibres is moving during step b. This enhances the speed of the method, and ensures uniform irradiation.

Preferably the method further comprises moving the sheet of fibres from the irradiation zone to the adhesion zone in less than 30 seconds.

A second aspect of the invention provides apparatus for manufacturing a composite prepreg, the apparatus comprising:
  a plasma source for irradiating a sheet of fibres with a plasma at substantially atmospheric pressure, and
  means for impregnating the sheet of fibres with the matrix.

A third aspect of the invention provides a method of manufacturing a composite material, the method comprising:
  irradiating a matrix sheet with a plasma, and
  coating a filler with the irradiated matrix sheet.

The third aspect of the invention recognises that irradiation of the matrix sheet may be used (optionally in conjunction with irradiation of the filler) to enhance adhesion between the filler and the matrix. The filler may be a sheet of fibres (in common with the first aspect of the invention) or may be a non-fibrous material or a single fibre.

A fourth aspect of the invention provides apparatus for manufacturing a composite material, the apparatus comprising:
  a plasma source for irradiating a matrix sheet with a plasma, and
  means for coating a filler with the irradiated matrix sheet.

BRIEF DESCRIPTION OF THE DRAWINGS

Embodiments of the invention will now be described with reference to the accompanying drawings, in which:

FIG. 1 shows a first step in a method of manufacturing a composite prepreg; and

FIG. 2 shows a second step in the method.

DETAILED DESCRIPTION OF EMBODIMENT(S)

Referring to FIG. 1, apparatus 1 for manufacturing a matrix film is shown. A coating head 2 comprises a funnel 3 filled with liquid matrix material 4: either a "melt" or a dispersion. The opening of the funnel 3 is positioned between a pair of rollers 5. The liquid matrix material 4 is applied by the rollers 5 to the upper face of a sheet of release paper 6 which is fed continuously from a release paper roll 7. The sheet of matrix film 8 and release paper 6 are wound onto a roller 10. When a roll of desired size has been formed, the flow of matrix 4 from the coating head is stopped, and the roller 10 is reversed. The matrix film 8 is wound onto a roller via a guide roller 12 to form a roll 11 of matrix film. At the same time the release paper 6 is wound back onto the release paper roll 7. The roll 11 is then removed and the process is repeated to form a second roll 13 of matrix film shown in FIG. 2.

The matrix material 4 is typically a polymer, and may be thermosetting (for example epoxy resin) or thermoplastic (for example polyetheretherketone—PEEK).

Referring to FIG. 2, a sheet of fibres 20 is fed from a roller (not shown) via a pair of guide rollers 21,22. The fibres making up the sheet 20 may be made of any organic or inorganic material such as carbon, glass, natural fibre or thermoplastic. The sheet 20 may be in the form of a unidirectional tape or a woven fabric. A pair of matrix films are unwound from the matrix film rolls 11,13 via rollers 22,23. The three-layer assembly is then heated by a heater 24 and compressed between three pairs of consolidation rollers 25. This causes the sheet to be impregnated with the matrix material to form a sheet of prepreg 26. The prepreg 26 is shown in FIG. 2 as two layers, but in reality will effectively be a single layer of matrix-impregnated fibre. The prepreg 26 is then wound on to a roller 27 along with a layer of release paper 28 which is unwound from a release paper roll 29 and applied to the prepreg by a pair of rollers 30,31.

Prior to entering an adhesion zone (indicated generally at 32, and defined by the rollers 22,33, heater 24 and consolidation rollers 25) the fibre sheet 20 and/or the matrix films from rolls 11,13 are irradiated with plasma in an irradiation zone (indicated generally at 33). Three plasma sources are shown in FIG. 2:

a first source 40 which is directed at the nip of the roller 22 so as to irradiate the opposed faces of the fibre sheet and the lower matrix film;

a second source 41 which is directed at the nip of the roller 23 so as to irradiate the opposed faces of the fibre sheet and the upper matrix film; and a third source 42 which is directed at the upper matrix film only.

Although three sources are shown in FIG. 2, more or less plasma sources may be used as required. Thus in general, plasma sources may be used to irradiate the fibre sheet only; one or both of the matrix films only; or the fibre sheet and one or both of the matrix films (as in FIG. 2).

Each plasma sources may be for example:

a "Plasmatec" plasma unit supplied by Plasmatec Inc. of Montreal, Canada;

a "Tantec" plasma unit supplied by Dyne Technology Ltd, of Tamworth, UK; or an "AX Series" plasma unit supplied by Adtec Europe Ltd (UK) of Hounslow Business Park, UK.

The plasma sources generate plasma at substantially atmospheric pressure. This means that the plasma sources do not need to be housed in a vacuum chamber as in U.S. Pat. No. 5,108,780, but instead may be housed under normal conditions (that is, in air at atmospheric pressure) along with the rest of the apparatus.

The irradiation and impregnation process are run simultaneously, instead of being run in series as batch processes. This enables the fibre sheet to be impregnated quickly after irradiation, while the active free radicals are still present.

The rollers are run continuously, so that the fibre sheet and matrix films are moving during irradiation and impregnation.

The plasma may be generated at ambient or elevated temperature and may be any mixture of gases such as oxygen, argon and nitrogen mixed in any proportion to form the required ionic species for treating the material. For example, the plasma may be:

nitrogen/argon
nitrogen/oxygen
nitrogen/oxygen/argon
air

Although only three plasma sources are shown in FIG. 2, depending on the width of the sheet 20, further plasma sources may be arranged in an array (that is, out of the plane of FIG. 2) to irradiate the full width of the fibre sheet and/or matrix films. The width may range between 3 mm and 20 meters.

The irradiation of the fibres and/or matrix generates free radicals on their surfaces and enhances adhesion between these components in the prepreg. These free radicals have a limited dwell time, so the plasma sources 40-42 are positioned sufficiently close to the rollers 22,23, and the rollers are run at a sufficient speed, to ensure that the layers are brought together by the rollers 22,23 as soon as possible after irradiation, typically less than 30 seconds after irradiation and preferably less than one second after irradiation. Typically the process is run at 2-10 meters per minute, although speeds of up to 400 meters per minute may be possible.

No separate adhesive is applied to the fibre sheet prior to combination with the matrix.

The prepreg can be used in the formation of aircraft components such as wing skins, stringers, spars, wing access panels, or spoilers; or non-aircraft components such as bicycle frames, industrial goods, sports goods, automotive products, wind energy products, or marine products such as boat hulls.

Although the invention has been described above with reference to one or more preferred embodiments, it will be appreciated that various changes or modifications may be made without departing from the scope of the invention as defined in the appended claims.

The invention claimed is:

1. A method of manufacturing a composite sheet, the method comprising:
   a. irradiating a sheet of fibres and a matrix film at an irradiation zone with a plasma at substantially atmospheric pressure from a plasma source, and
   b. impregnating the sheet of fibres with said matrix film at an adhesion zone;
   wherein processes a. and b. are performed simultaneously, said matrix film is unwound from a matrix film roll via a roller, opposed faces of said sheet of fibres and said matrix film are brought together at a nip of said roller, and said sheet of fibres and said matrix film are irradiated by directing said plasma source at said nip of said roller so as to irradiate said opposed faces of said sheet of fibres and said matrix film.

2. The method of claim 1 wherein process b. is performed at substantially atmospheric pressure.

3. The method of claim 1 wherein process b. is performed in air.

4. The method of claim 1 further comprising moving the sheet of fibres and the matrix film from the irradiation zone to the adhesion zone in less than 30 seconds.

5. A method of manufacturing a composite sheet, the method comprising:
   a. irradiating a sheet of fibres and a first matrix film at a first irradiation zone with a plasma at substantially atmospheric pressure from a first plasma source, and
   b. impregnating said sheet of fibres with said matrix film at an adhesion zone;
   wherein processes a. and b. are performed simultaneously, said first matrix film is unwound from a first matrix film roll via a first roller, opposed faces of said sheet of fibres and said first matrix film are brought together at a nip of said first roller, and said sheet of fibres and said first matrix film are irradiated by directing said first plasma source at said nip of said first roller so as to irradiate said opposed faces of said sheet of fibres and said first matrix film, and wherein the method further comprises:
   c. irradiating said sheet of fibres and a second matrix film at a second irradiation zone with a plasma at substantially atmospheric pressure from a second plasma source, and
   d. impregnating the sheet of fibres with said second matrix film at said adhesion zone;

wherein processes c. and d. are performed simultaneously, said second matrix film is unwound from a second matrix film roll via a second roller, opposed faces of said sheet of fibres and said second matrix film are brought together at a nip of said second roller, and said sheet of fibres and said second matrix film are irradiated by directing said second plasma source at said nip of said second roller so as to irradiate said opposed faces of said sheet of fibres and said second matrix film.

6. The method of claim 5 wherein process b. is performed at substantially atmospheric pressure.

7. The method of claim 5 wherein process b. is performed in air.

8. The method of claim 5 further comprising moving the first and second matrix films from the first and second irradiation zones to the adhesion zone in less than 30 seconds.

* * * * *